US012611361B2

(12) United States Patent
Lee et al.

(10) Patent No.: US 12,611,361 B2
(45) Date of Patent: Apr. 28, 2026

(54) HEALTH CARE DEVICE AND HEALTH CARE METHOD

(71) Applicant: TAIWAN OASIS TECHNOLOGY CO., LTD., New Taipei City (TW)

(72) Inventors: Ming-Shun Lee, New Taipei City (TW); Chin-Sung Tseng, New Taipei City (TW); Hsu-Hui Tseng, New Taipei City (TW); Hsien-Ching Tseng, New Taipei City (TW); Wei-Long Lee, New Taipei City (TW)

(73) Assignee: TAIWAN OASIS TECHNOLOGY CO., LTD., New Taipei City (TW)

( * ) Notice: Subject to any disclaimer, the term of this patent is extended or adjusted under 35 U.S.C. 154(b) by 759 days.

(21) Appl. No.: 18/058,399

(22) Filed: Nov. 23, 2022

(65) Prior Publication Data

US 2024/0115457 A1 Apr. 11, 2024

(30) Foreign Application Priority Data

Oct. 11, 2022 (TW) .................................. 111138393

(51) Int. Cl.
*A61H 23/02* (2006.01)
*A61H 39/00* (2006.01)

(52) U.S. Cl.
CPC ....... *A61H 23/0236* (2013.01); *A61H 39/007* (2013.01); *A61H 2205/083* (2013.01)

(58) Field of Classification Search
CPC ............ A61H 2201/195; A61H 39/007; A61H 39/04; A61H 39/02; A61H 23/0236–0245
(Continued)

(56) References Cited

U.S. PATENT DOCUMENTS 4,753,225 A * 6/1988 Vogel ................. A61H 23/0236 601/47
2004/0097850 A1* 5/2004 Plante ................ A61H 23/0236 601/48
(Continued)

FOREIGN PATENT DOCUMENTS

CN 108158563 A 6/2018
KR 200376020 Y1 * 3/2005 ............. A61H 23/02
(Continued)

OTHER PUBLICATIONS

Translation of KR 2003-76020-Y1. Accessed from PE2E-Search on Sep. 12, 2025. (Year: 2003).*
(Continued)

*Primary Examiner* — Paige Kathleen Bugg
(74) *Attorney, Agent, or Firm* — MUNCY, GEISSLER, OLDS & LOWE, P.C.

(57) ABSTRACT

A health care device and a health care method are illustrated, the health care method is used to arrange the health care device at a predetermined location in front of a belly button of a user with a predetermined distance, and to emit the low-frequency wave with a predetermined frequency to the belly button by using a low-frequency wave emitter. The health care device is formed by the low-frequency wave emitter and a cone/pyramid part. The predetermined frequency is 1.27 Hz to 1.81 Hz, and the predetermined distance is 5 cm to 8 cm. The above health care device and method can increase contents of active T cells and B cells in blood and increase an ability of NK cell strains for poisoning cancer cell strains (K562). In short, the above health care device and method have health benefits without a risk of excessive energy causing harm.

3 Claims, 7 Drawing Sheets

(58) Field of Classification Search
USPC ........................................................ 601/47
See application file for complete search history.

(56) References Cited

U.S. PATENT DOCUMENTS

| | | | | |
|---|---|---|---|---|
| 2016/0030280 A1* | 2/2016 | Jones | ................. | A61H 23/0236<br>601/47 |
| 2020/0390650 A1* | 12/2020 | Zhang | .................. | A61H 39/086 |

FOREIGN PATENT DOCUMENTS

| | | | |
|---|---|---|---|
| KR | 100722217 | B1 | 5/2007 |
| TW | 202142211 | A | 11/2021 |
| TW | M628886 | U | 6/2022 |
| TW | 202228603 | A | 8/2022 |
| TW | M638574 | U | 3/2023 |

OTHER PUBLICATIONS

Office Action with the First Search Report for the Corresponding Taiwanese Application111138393 issued at Jul. 10, 2023.
"Effects of low frequency magnetic fields on Na, K-ATPase activity, M. Blank, L. Soo, V. Papstein, Bioelectrochemistry and Bioenergetics 38 (1995) 267-273".
Office Action with the first search report for the corresponding DE Appln. No. 10 2022 131 499.5 issued at Sep. 8, 2023.
Office Action with the Second Search Report for the Corresponding German Application No. 10 2022 131 499.5 dated Feb. 12, 2024.

* cited by examiner

HEALTH CARE DEVICE AND HEALTH CARE METHOD

TECHNICAL FIELD

The present disclosure relates to a health care device and a health care method, and in particular to, a health care device and a health care method, each of which emits a low-frequency wave into a human body for health caring.

RELATED ART

Known health care at present for example comprises scraping, cupping, acupuncture, massage etc., although the purpose of health care can be achieved, there are still shortcomings. For example, scraping may make skin damaged, and increases the risk of infection. Effect of cupping is similar to that of scraping, but the used can must contact the skin, so the cleanliness and hygiene of the can is a concern. Acupuncture uses needles to penetrate the corresponding acupoints of the human body, so there is an invasive risk. Although massage has no invasive risk, it relies on others to help relax the muscles.

The health care of acupuncture is improved by others, and a microwave acupuncture instrument which adopts the health care device emitting non-invasive radiation waves to human acupoints is proposed. An oscillation frequency of the radiation waves emitted by the microwave oscillator in the microwave acupuncture instrument is 1000 MHz to 2000 MHz. The oscillation frequency is very high, so that it is very easy to cause damage due to excessive radiation (energy). In practice, to achieve the desired effect of health care, the propagating directions of the radiation waves of the microwave acupuncture instrument also must align to corresponding acupoints of the human body. However, most people are not professionals related to traditional Chinese medicine and cannot accurately identify each person's individual acupoints. Therefore, the microwave acupuncture instrument is not actually a universal and wide-used health care device.

Therefore, it is a trend in the industry to develop a health care device and a health care method that can achieve effects of convenient operation, accurate identification of the use position, non-invasive treatment, non-contact treatment, and no harm caused by excessive energy risk.

SUMMARY

The present disclosure is mainly based on recognizing that the main tissues and organs of the human body (referring to organisms, rather than artificial tissues or organs) have inherent oscillation frequencies, such as 8-12 Hz for the head, 4-6 Hz for the thorax, and 5 Hz for the heart, 6-9 Hz for the abdominal cavity, 1.2 Hz for the blood flow, and 1.8 Hz for the bone tissue. When a certain part of the human body is in the low-frequency wave field of 0-20 Hz, such as a low-frequency sound wave or infrasonic (by contrast, the sound is called the ultra-high-frequency sound or ultrasonic if the frequency is higher than 20 KHz), if its sound pressure level (the unit is dB) reaches a certain threshold, the elastic wall of the outer layer of the tissue and organ corresponding to this part will first enter a vibration state, and then the vibration will be transmitted to the interior of the tissue and organ. In particular, resonance occurs when the frequency of the infrasonic is synchronized with the inherent oscillation frequency of the tissues and organs, and the tissues and organs receive the greatest stimulation at this time. When the resonance caused by infrasonic acts on tissues and organs, it also acts on the cell structures of tissues and organs, such as the mitochondrion of the cell, which is the main place of the oxidative phosphorylation and synthesis of adenosine triphosphate (ATP) in cells. The adenosine triphosphates (ATPs) in the cells can provide chemical energy for cell activities, so the mitochondrion is also called the powerhouse of the cell.

The ATP relates to membrane potential (i.e., transmembrane potential or membrane voltage) of a cell membrane, and the cell membrane is a thin film which formed by a lipid bilayer (i.e., a phospholipid bilayer). The cell membranes of most livings are mainly formed by the lipid bilayers, and interior of the lipid bilayer is filled with dielectric material, and thus the cell membrane the lipid bilayer is electrically equivalent to a capacitor. In addition to the lipid layer, the structure of the cell membrane further comprises proteins, some of which act as ion channels to allow ions (such as positively charged sodium ions Na+ and potassium ions K+) to transport across the cell membrane. This phenomenon can be understood in physics, and that is, the capacitor of the cell membrane is a leakage capacitor, and the leakage current (ion transport) passes through the capacitor.

Further, when the resonances caused by the above infrasonic are applied to the mitochondrion, it affects the binding state of some enzymes, such as ATPase, to the cell membrane and the activities of the enzymes. The ATPase is an enzyme that can decompose ATP to generate energy, and can activate Na+ and K+, so it is also called $Na^+$—$K^+$ ATPase or $Na^+$—$K^+$ pump ($Na^+$—$K^+$ pump). The Na+-K+ pump can regulate concentration of sodium ions and potassium ions inside and outside of the cell membrane, such that the membrane potential can be adjusted, for example, returning from action potential to resting membrane potential. First, the cell membrane is at the resting membrane potential, and then the cell membrane at the resting membrane potential is properly stimulated to generate the action potential by the following stages of polarization, depolarization, and repolarization and hyperpolarization, especially during the hyperpolarization stage, the membrane potential of the action potential will be lower than the resting membrane potential. At this time, $Na^+$—$K^+$ pumps must be relied on to assist the membrane potential of the action potential during the hyperpolarization stage to the resting membrane potential. It can be understood that long-term stimulation (such as stress) or long-term human inflammation, or long-term lack of ATP and/or ATPase, will cause cells to be in a hyperpolarized stage for a long time, so that the membrane potential will be lower than the resting membrane potential.

Based on the aforementioned understanding that the cell membrane is equivalent to a capacitor (or battery) in electrical properties, the membrane potential is equivalent to the voltage of the battery, and the membrane potential of the action potential during the aforementioned hyperpolarization stage will be lower than the resting membrane potential, wherein the membrane potential of the action potential in the hyperpolarization stage can be understood as the residual power (voltage) after the battery has been depleted after being used, and the resting membrane potential can be corresponding to the initial power (voltage) that is not consumed or recharged. According to statistics, there are 37.2 trillion cells on average in the human body, in other words, there are 37.2 trillion "batteries" in the human body on average. It can be understood that when the body is under long-term stress or inflammation, the cells are correspondingly in the state of "battery power consumption" in the hyperpolarization stage for a long time, so the cells cannot perform or maintain their proper functions, and human tissues and organs also present pathological phenomena or people present fatigue. However, if the low-frequency wave of a certain intensity and/or frequency acts on the cell at this time, the energy of the wave can be converted into thermal energy, biochemical energy and bioelectric energy, so as to increase the activity of ATPase, thereby affecting the activity of ATPase In the hyperpolarization stage, the membrane potential of the action potential is restored to the resting membrane potential, which makes the aforementioned "battery" corresponding to human cells return to the initial power (voltage) of the full power of the resting membrane potential from the "battery power consumption" state of the membrane potential during the aforementioned hyperpolarization stage. In other words, the low-frequency wave can "charge" the cells in the hyperpolarization stage, and the low-frequency wave can act on the tissues and organs, so that the damaged tissue can be repaired under the stimulation of the low-frequency wave and restore normal functions. One of the examples about the relationship between low-frequency waves and organisms, for example, the extremely low frequency (ELF) of Schumann resonance frequency of the low-frequency wave is 7.83 Hz, and exactly, the same as the frequency of the hippocampus of the mammalian brain, especially the alpha wave and theta wave of the human brain are also close to 8 Hz, so the US National Aeronautics and Space Administration (NASA) installs a Schumann wave generator in the manned space capsule to maintain the physical and mental health of astronauts in space. About using the low-frequency wave to increase the ATPase activity, it can refer to "Effects of low frequency magnetic fields on Na, K-ATPase activity, M. Blank, L. Soo, V. Papstein, Bioelectrochemistry and Bioenergetics 38 (1995) 267-273", wherein the low-frequency wave (magnetic wave) of 0-70 Hz increases the activity of $Na^+$—$K^+$ ATPase by 5-10%. In other words, low-frequency wave can activate cells and "charge" cells in the hyperpolarization stage, so low-frequency wave can be applied to "cell activation technology". It is specifically stated here that the low-frequency wave may also include an electromagnetic wave, such as an electric wave, a magnetic wave, or a light wave, or an infrasonic.

The present disclosure recognizes in addition that according to the theory of traditional Chinese medical science, the belly button of human body is the Shenque acupoint and is the place where Ren meridian, Du meridian, Dai meridian, and Chong meridian pass through, so when stimulating Shenque acupoint, the whole body can be adjusted by the meridians connecting the internal organs. Furthermore, according to the theory of modern medicine, the belly button is the thinnest part of the cuticle of the epidermis in the abdomen and there is no fat tissue under the belly button, so its barrier function is the weakest. In addition, the belly button skin also has abundant venous network and hypogastric artery branch except the microcirculation blood vessel that the general skin also has. Therefore, as long as some effect or change is carried out to the blood in the belly button skin microcirculation vessel, this effect or change can be brought into the human blood circulation system. Moreover, the belly button of the human body is easy to identify its position and will not vary depending on the height, fat or thinness of the person. Therefore, using the belly button as the corresponding position which the health care device acts on the human body will allow the user to accurately identify and use it.

In the present disclosure, the used low-frequency wave emitter that can generate low-frequency waves (such as low-frequency electric waves, low-frequency magnetic waves, and low-frequency sound waves) is not in contact with the belly button, and the low-frequency wave emitter that emits low-frequency wave is disposed toward the belly button to achieve the effect similar to acupuncture, so that a non-invasive and non-contact health care method can be achieved. Preferably, the used infrasonic emitter that can generate infrasonic is not in contact with the belly button, and the infrasonic emitter that emits the infrasonic is disposed toward the belly button to achieve the effect similar to acupuncture, so that a non-invasive and non-contact health care method can be achieved. It is noted that, the infrasonic in the present disclosure is a low frequency acoustic wave. If the low-frequency wave emitter is directly used as the component of the health care device, the problem of excessive energy risk caused by the high-frequency microwave oscillator can be avoided, and at the same time, it can also avoid the adverse effects of electric waves or magnetic waves on some people with special constitutions.

Since it is recognized that the infrasonic can achieve the effect similar to that of acupuncture, and the effect of acupuncture on the immune system is that acupuncture can increase the content of interferon gamma (γ-IFN) and neuropeptide beta-endorphin (β endorphin), so as to activate NK cells (natural killer cells), wherein the NK cells secrete cytokines and regulate the inflammatory response. The NK cells are immune cells with large granules in the cytoplasm, developed from bone marrow lymphoid stem cells, mainly distributed in peripheral blood (including blood in microcirculation blood vessels) and spleen. There also a small presence of the NK cells in lymph nodes and other organization.

As mentioned above, "the belly button is the thinnest part of the cuticle of the epidermis in the abdomen and there is no fat tissue under the belly button, so its barrier function is the weakest. In addition, the belly button skin also has abundant venous network and hypogastric artery branch except the microcirculation blood vessel that the general skin also has. Therefore, as long as some effect or change is carried out to the blood in the belly button skin microcirculation vessel, this effect or change can be brought into the human blood circulation system." Therefore, when the infrasonic emitter emits the infrasonic towards the belly button, it will trigger an effect similar to that of the acupuncture, which will increase the content of γ-IFN and β endorphins in the blood of the belly button skin microcirculation blood vessels and activate NK cells, B cells (B lymphocytes) and active T cells (active T lymphocytes), and because NK cells, B cells and active T cells are activated, they secrete cytokines, therefore regulating inflammation or secreting antibodies. In addition, when launching infrasonic emitter to emit the infrasonic toward the belly, the active T cell in the belly button skin microcirculation blood vessels is increased as well as the activity of $Na^+$—$K^+$ ATPase in the belly button skin microcirculation blood vessels, so the activity of active T cells can be improved. In other words, when the infrasonic emitter emits bass infrasonic towards the belly button, the active T cell with low activity can be "charged" to restore its activity, so that the active T cell after being "charged" can be re-tested and detected. Thus, the efficacy of the health care device of the present disclosure can be verified if the content changes of NK cells, B cells or active T cells in the blood are detected. Certainly, the ability NK cell strain for poisoning cancer cell strain (K562) can be used to verify the results of the present disclosure, for example, effector to target cell ratio (E/T ratio) of the NK cell mixed culture sample can be used to detect ability of poisoning, and the difference of the results can be compared to verify the feasibility of the present disclosure.

According to the above descriptions, the present disclosure provides a health care method comprising steps as follows. The above health care device is arranged at a predetermined location in front of a belly button of a user with a predetermined distance. The health care device is used to emit the low-frequency wave with a predetermined frequency to the belly button.

According to the above descriptions, the present disclosure provides a health care device. The health care device is arranged at a predetermined location in front of a belly button of a user with a predetermined distance. The health care device at least comprises a low-frequency wave emitter.

According to the above descriptions, the present disclosure further provides another health care method, the health care device is arranged at a predetermined location in front of a belly button of a user with a predetermined distance, and the health care device is used to emit the low-frequency wave with a predetermined frequency to the belly button. The health care device at least comprises a low-frequency wave emitter, a column part and a cone/pyramid part. The column part has a top surface, a bottom surface and a body, wherein two ends of the body of the column part are respectively connected to the top surface and the bottom surface of the column. The cone/pyramid part has a vertex, a bottom surface and a body, wherein two ends of the body of the cone/pyramid part are respectively connected to the vertex and the bottom surface of the cone/pyramid part. The top surface of the column part is connected to the bottom surface of the cone/pyramid part. The low-frequency wave emitter is connected to the bottom surface of the column part.

In one embodiment, the predetermined location is located on a virtual bottom surface of a virtual cone/pyramid above the belly button. The predetermined distance is 5 cm to 8 cm. The predetermined location is located on a center of the virtual bottom surface, the virtual cone/pyramid is a virtual cone, and the predetermined location is a circular center of the virtual bottom surface. The predetermined distance is a distance from the circular center of the virtual bottom surface to the belly button, and the vertex is located on the predetermined location.

In one embodiment, the vertex has a rod being vertically standing and extends away from the bottom surface of the cone/pyramid part along a longitudinal direction of the rod, and the longitudinal direction of the rod is coincided with a normal line from a center of the bottom surface of the cone/pyramid part and extending towards the belly button, wherein a tip of the rod is located at the predetermined location.

According to the above descriptions, the present disclosure provides a health care device, and the health care device at least comprises a low-frequency wave emitter, a column part and a cone/pyramid part. The column part has a top surface, a bottom surface and a body, wherein two ends of the body of the column part are respectively connected to the top surface and the bottom surface of the column. The cone/pyramid part has a vertex, a bottom surface and a body, wherein two ends of the body of the cone/pyramid part are respectively connected to the vertex and the bottom surface of the cone/pyramid part. The top surface of the column part is connected to the bottom surface of the cone/pyramid part. The low-frequency wave emitter is connected to the bottom surface of the column part.

Or alternatively, according to the above descriptions, the present disclosure provides a health care device at least comprising a cone/pyramid part and a low-frequency wave emitter. The cone/pyramid part has a vertex, a bottom surface and a body, wherein two ends of the body of the cone/pyramid part are respectively connected to the vertex and the bottom surface of the cone/pyramid part. The low-frequency wave emitter is connected to the bottom surface of the cone/pyramid part, configured to emit a low-frequency wave with a predetermined frequency.

In one embodiment, the predetermined frequency is 1.27 Hz to 1.81 Hz.

In one embodiment, the predetermined frequency is 1.45 Hz.

In one embodiment, the cone/pyramid part is a one-piece wooden cone or pyramid.

According to the above descriptions, the present disclosure provides a health care method comprising steps as follows. The above health care device is arranged at a predetermined location in front of a belly button of a user with a predetermined distance. The health care device is used to emit the low-frequency wave with a predetermined frequency to the belly button.

To sum up, the health care device and the health care method provide by the present disclosure can achieve effects of convenient operation, accurate identification of the use position, non-invasive treatment, non-contact treatment, and no harm caused by excessive energy risk.

BRIEF DESCRIPTIONS OF DRAWINGS

The accompanying drawings are included to provide a further understanding of the present disclosure and are incorporated in and constitute a part of this specification. The drawings illustrate exemplary embodiments of the present disclosure and, together with the description, which are used to explain the principles of the present disclosure.

DETAILS OF EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
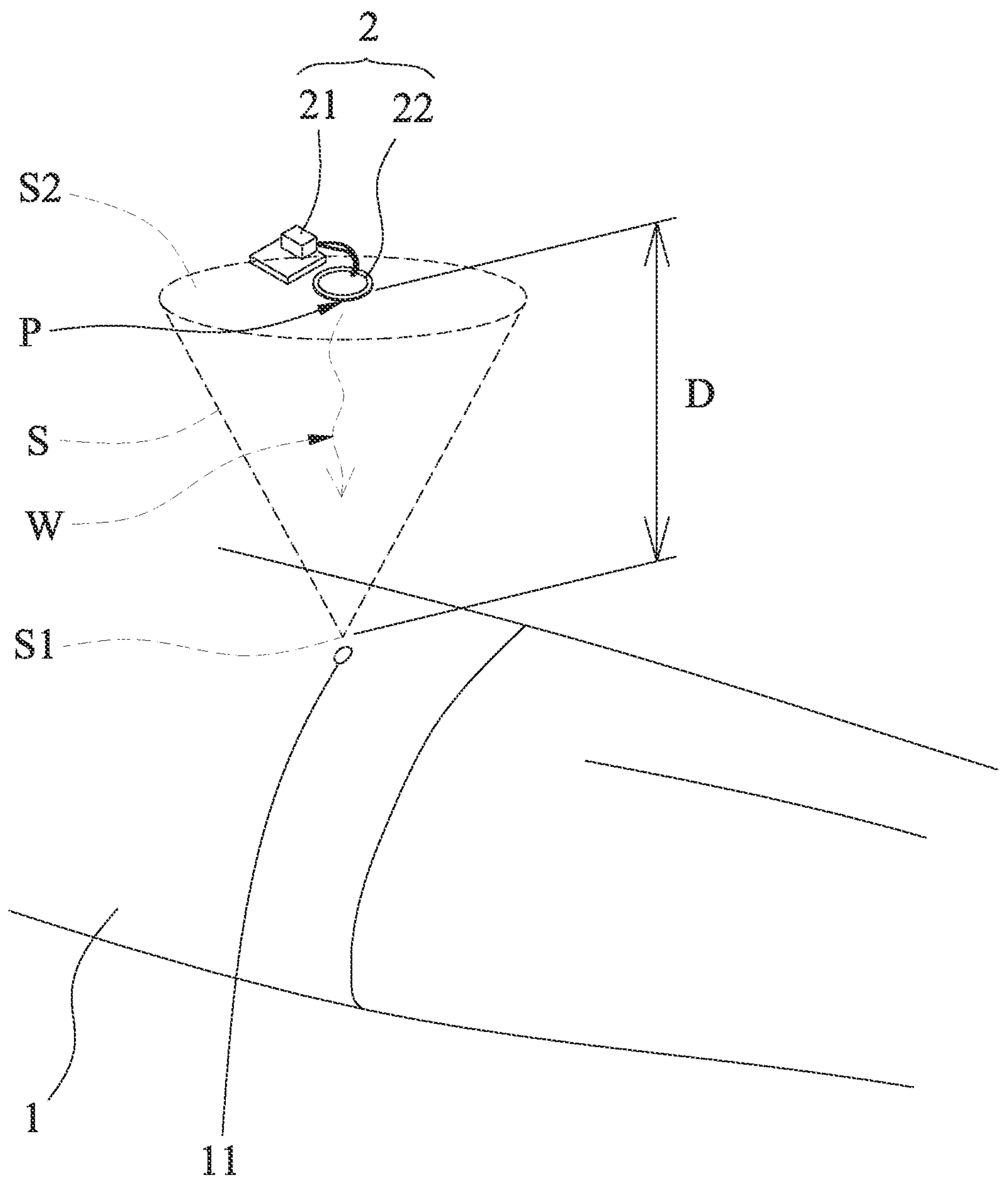
FIG. 1 is a schematic diagram of executing a health care method according to an embodiment of the present disclosure.

Refer to FIG. 1, the present disclosure provides a health care method. The method arranges a low-frequency wave emitter 2 at a predetermined location P in front of a belly button 11 of a user 1 with a predetermined distance D and makes the low-frequency wave emitter 2 emit a low-frequency wave W of the predetermined frequency forward to the belly button 11 of the user 1. The aforementioned “front” refers to the front of the body in the direction of the abdomen, and correspondingly, the “back” refers to the back of the human body. The predetermined location P is located on a virtual bottom surface S2 of a virtual cone/pyramid S with the belly button 11 as a virtual vertex S1 of the virtual cone/pyramid S. The predetermined distance D is designed to be not larger than 8 cm, or the predetermined distance D is designed to be not less than 5 cm, or the predetermined distance D is designed to be within a range between 5 cm and 8 cm (p.s. the range comprises two end values of 5 cm and 8 cm). Preferably, the predetermined location P is located on the center of the virtual bottom surface S2, for example, the virtual cone/pyramid S is a cone, the predetermined location P is located on the circular center of the virtual bottom surface S2 being a circle surface, and the predetermined distance D is the distance between circular center and the belly button 11, which is within the range between 5 cm and 8 cm.

The low-frequency wave emitter 2 is preferably an infrasonic transducer, and the low-frequency wave W can be the infrasonic. The structure of the infrasonic transducer comprises a power supply 21 and a vibration part 22. The vibration part 22 is electrically connected to the power supply 21. The vibration part 22 is a disc-shaped piezoelectric ceramic transducer. The piezoelectric ceramic transducer is made of piezoelectric material polarized in the thickness direction. The power supply 21 provides power to the vibration part 22 to make the vibration part 22 vibrates in the thickness direction to generate the infrasonic of the predetermined frequency. In the present disclosure, the predetermined frequency is not larger than 1.81 Hz, or the predetermined frequency is not less than 1.27 Hz, or the predetermined frequency is within a range between 1.27 Hz and 1.81 Hz (p.s. the range comprises two end values of 1.27 Hz and 1.8 Hz). Preferably, the predetermined frequency is 1.45 Hz.

In other words, the present disclosure also provides a health care device, the health care device is arranged at a predetermined location P in front of the belly button 11 of the user with a predetermined distance D. The health care device at least comprises a low-frequency wave emitter 2.

<Detection Manner and Effect of Experiment 1>

The health care method is executed to personnel A1 and personnel A2, the predetermined distance D is selected to be 5 cm, the predetermined frequency is selected to be 1.45 Hz, and the low-frequency wave is selected to be the infrasonic. The personnel A1 is a 74-years old man, the personnel A2 is a 72-years old woman. Before executing the health care method, blood samples are drawn from the personnel A1 and personnel A2 and sent to the medical laboratory for immunological examination to check the percentage (i.e., content) of the active T cells. On the 19-th day after the execution of the health care method for 2 hours, the blood sample of the personnel A1 is again taken and sent to the medical laboratory for immunological examination, and on the 42-nd day after the execution of the health care method for 2 hours, the blood sample of the personnel A2 is also taken again and sent to the medical laboratory for immunological examination. The percentages of the active T cells of the blood samples are examined in the same way, and the results are recorded in TABLE 1 which is described later.

TABLE 1

| | PERSONNEL A1 | | | PERSONNEL A2 | | |
|---|---|---|---|---|---|---|
| | BEFORE EXECUTION | AFTER EXECUTION | CHANGE RATE = CONTENT OF ACTIVE T CELLS AFTER EXECUTION/ CONTENT OF ACTIVE T CELLS BEFORE EXECUTION | BEFORE EXECUTION | AFTER EXECUTION | CHANGE RATE = CONTENT OF ACTIVE T CELLS AFTER EXECUTION/ CONTENT OF ACTIVE T CELLS BEFORE EXECUTION |
| CONTENT OF ACTIVE T CELLS | 6.2% | 12.8% | 206.5% | 5.3% | 7.9% | 149% |

From TABLE 1, before executing the health care method, the content of the active T cells in personnel A1 is 6.2%, and after executing the health care method, the content of the active T cells increases to 12.8%, and the change rate is 206.5%, that is, the content increment of the active T cells is 106.5%. Before executing the health care method, the content of the active T cells in personnel A2 is 5.3%, and after executing the health care method, the content of the active T cells is increased to 7.9%, and the change rate is 149%, that is, the content increment of the active T cells is 49%. Therefore, the health care method provided by the present disclosure can promote the proliferation of the active T cells, and if a single execution of 2 hours can make the content of the active T cells increase, even after 42 days, the content increment of the active T cells can still maintain to be 49%. Apparently, the health care method of the present disclosure is highly effective and can maintain long-term health effects.

<Detection Manner and Effect of Experiment 2>

The health care method is executed to 14 people, the predetermined distance D is selected to be 5 cm, the predetermined frequency is selected to be 1.45 Hz, and the low-frequency wave is selected to be the infrasonic. Before executing the health care method, blood samples are drawn from the 14 people and sent to the medical laboratory for immunological examination to check the percentage (i.e., content) of the B cells (CD19+). On the 19-th day after the execution of the health care method for 2 hours, the blood samples of the 14 people are again taken and sent to the medical laboratory for immunological examination, the percentages of the B cells of the blood samples are examined in the same way, and the results are recorded in TABLE 2 which is described later.

TABLE 2

| | BEFORE EXECUTION | AFTER EXECUTION | CHANGE RATE = CONTENT OF B CELLS AFTER EXECUTION/ CONTENT OF B CELLS BEFORE EXECUTION |
|---|---|---|---|
| CONTENT OF B CELLS | 12.2% | 13.6% | 111.4% |

From TABLE 2, before executing the health care method, the average content of the B cells in the 14 people is 12.2%, and after executing the health care method, the average content of the B cells in the 14 people is increased to 13.6%, and the change rate is 111.4%, that is, the average content increment of the active T cells of the B cells is 11.4%. Therefore, the health care method provided by the present disclosure can promote the proliferation of the B cells, and if a single execution of 2 hours can make the content of the B cells increase. Apparently, the health care method of the present disclosure is highly effective for health.

<Detection Manner and Effect of Experiment 3>

The health care method is executed to personnel B1 and personnel B2, the predetermined distance D is selected to be 5 cm, the predetermined frequency is selected to be 1.45 Hz, and the low-frequency wave is selected to be the infrasonic. Before executing the health care method, blood samples are drawn from the personnel B1 and personnel B2 and sent to the medical laboratory for immunological examination. On the 19-th day after the execution of the health care method for 2 hours, the blood sample of the personnel B1 and personnel B2 are again taken and sent to the medical laboratory for immunological examination. Regarding each of the blood samples before the execution of the health care method and after the execution of the health care method, the NK cells and the cancer cell strains (K562) of the blood are mixed with a ratio of 6.25:1 (effector:target) to co-cultivate, and then the death status of the cancer cell strains is analyzed, thus obtaining the ability (the unit is percentage) of the NK cell for poisoning the cancer cell strains (the relative operation details for measuring the ability of the NK cell for poisoning the cancer cell strains can be further seen in TW patent I439275). The data of the abilities of the NK cell for poisoning the cancer cell strains is recorded in TABLE 3.

TABLE 3

| | PERSONNEL B1 | | | PERSONNEL B2 | | |
|---|---|---|---|---|---|---|
| | BEFORE EXECUTION | AFTER EXECUTION | CHANGE RATE = ABILITY AFTER EXECUTION/ ABILITY BEFORE EXECUTION | BEFORE EXECUTION | AFTER EXECUTION | CHANGE RATE = ABILITY AFTER EXECUTION/ ABILITY BEFORE EXECUTION |
| Percentage of cancer cell strains which is poisoned and killed by the NK cells | 24.3% | 33.6% | 138.3% | 5.5% | 7.2% | 131% |

From TABLE 3, before executing the health care method, the ability of the NK cell strains for poisoning the cancer cell strains (K562) of the personnel B1 is 24.3%, and after executing the health care method, the ability of the NK cell strains for poisoning the cancer cell strains (K562) of the personnel B1 is increased to 33.6%, and the change rate is 138.3%, that is, the poisoning ability increment is 38.3%. Before executing the health care method, the ability of the NK cell strains for poisoning the cancer cell strains (K562) of the personnel B2 is 5.5%, and after executing the health care method, the ability of the NK cell strains for poisoning the cancer cell strains (K562) of the personnel B2 is increased to 7.2%, and the change rate is 131%, that is, the poisoning ability increment is 31%. Therefore, the health care method provided by the present disclosure can promote ability of the NK cell strains for poisoning the cancer cell strains (K562). Apparently, the health care method of the present disclosure is highly effective and can maintain long-term health effects.

Figure 2:
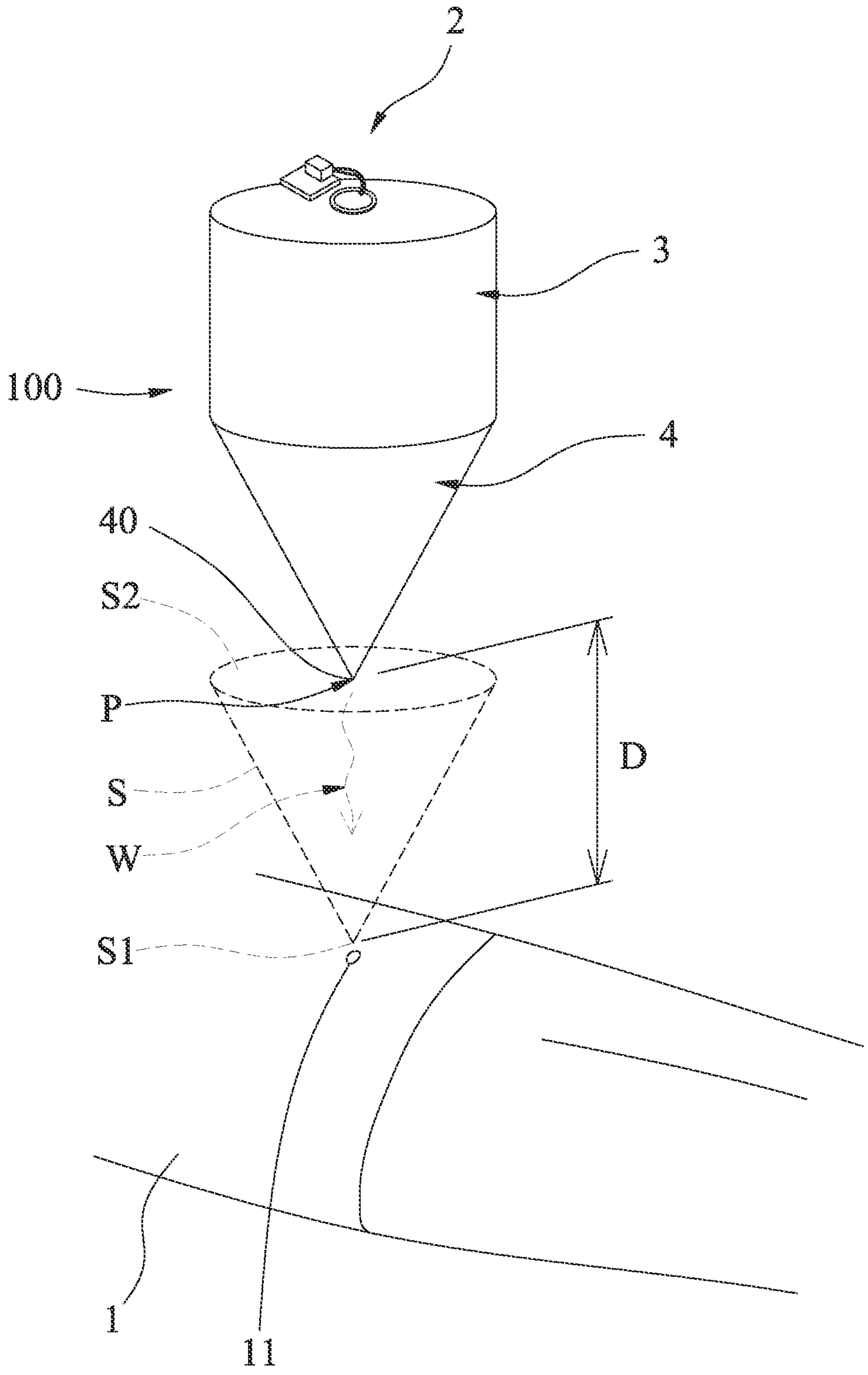
FIG. 2 is a schematic diagram showing a structure of a health care device when executing a health care method according to an embodiment of the present disclosure.
Figure 3:
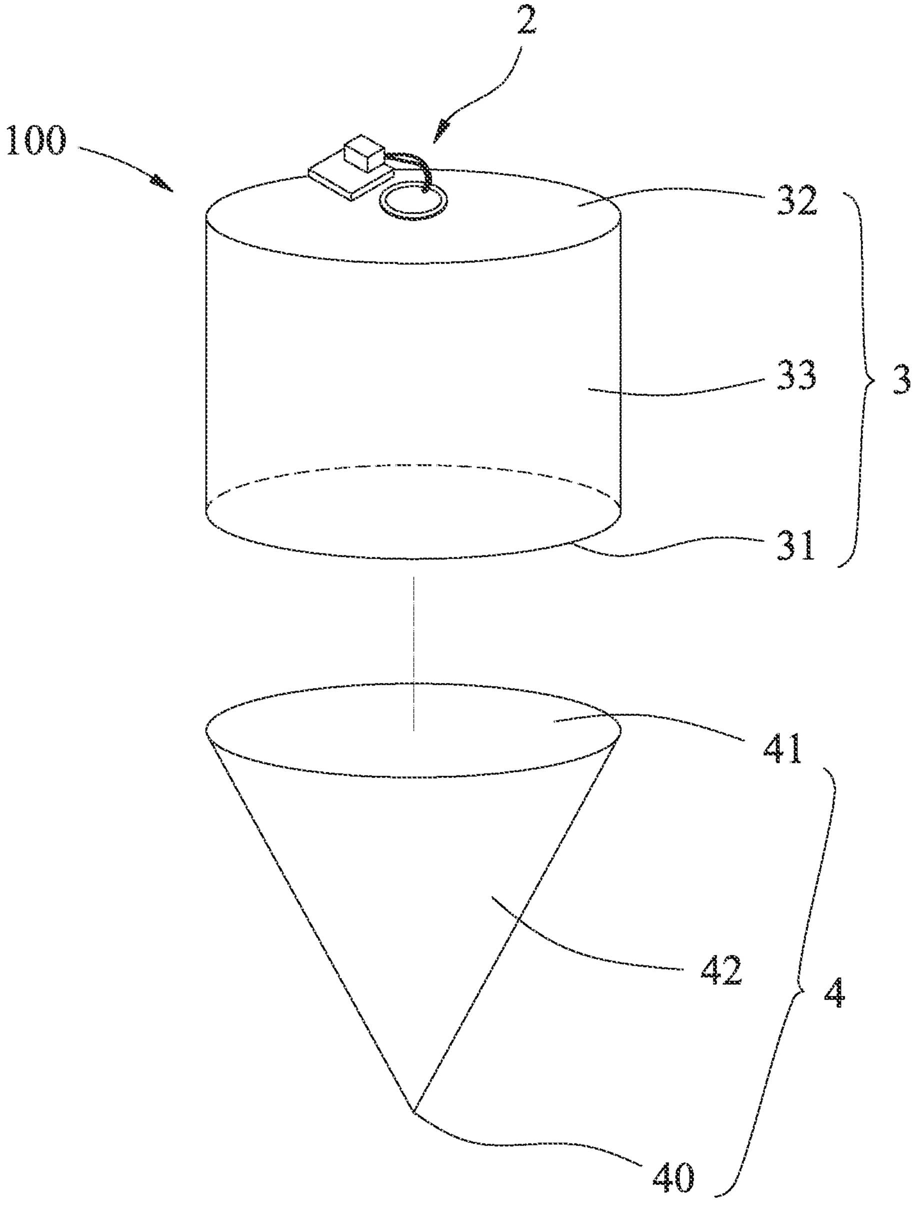
FIG. 3 is a schematic diagram showing a structure of a health care device according to an embodiment of the present disclosure.

Refer to FIG. 2 and FIG. 3, the present disclosure further provides a health care device 100 for executing the above health care method. The health care device 100 comprises the low-frequency wave emitter 2, a column part 3 and a cone/pyramid part 4. The column part 3 is preferably the circular column, the column part 3 has a top surface 31, a bottom surface 32 and a body 33, and the two ends of the body 33 of the column part 3 are respectively connected to the top surface 31 of column part 3 and the bottom surface 32 of column part 3. The cone/pyramid part 4 has a vertex 40, a bottom surface 41 and a body 42, wherein two ends of the body 42 of the cone/pyramid part 4 are respectively connected to the vertex 40 and the bottom surface 41 of the cone/pyramid part 4. The top surface 31 of the column part 3 is correspondingly joined with the bottom surface 41 of the cone/pyramid part 4, for example, by welding or screwing. Preferably, the column part 3 and the cone/pyramid part 4 are respectively metal columns and metal cones, respectively. More preferably, the column part 3 and the cone/pyramid part 4 are formed integrally, in other words, the top surface 31 of the column part 3, the body 33 of the column part 3, the body 42 of the cone/pyramid part 4 and the vertex 40 of the cone/pyramid part 4 are formed integrally, i.e., the column part 3 and the cone/pyramid part 4 are one-piece part.

The low-frequency wave emitter 2 is connected with the bottom surface 32 of the column part 3, preferably this low-frequency wave emitter 2 is directly connected with the bottom surface 32 of the column part 3, such as this low-frequency wave emitter 2 is welded or screwed to the bottom surface 32 of the column part 3, so when the power supply 21 is activated, the vibration part 22 will generate the low-frequency wave W of the predetermined frequency (please refer to FIG. 1 again). Next, the low-frequency wave W is transmitted to this bottom surface 32 of column part 3, and the body 33 of the column part 3 is used to transmit the low-frequency wave W sequentially to the bottom surface 41 of the cone/pyramid part 4 and this vertex 40. By using the structure of the cone/pyramid part 4 which the bottom surface 41 of the cone/pyramid part 4 is designed to be wider than and tapered to the vertex 40, the energy of the low-frequency wave W is more concentrated as it is transmitted towards the vertex 40. Therefore, when the low-frequency wave W is delivered to this vertex 40, the energy of the low-frequency wave W is gathered to the maximum, and then emitted towards the belly button 11 from the vertex 40. The vertex 40 of the cone/pyramid part 4 is a tip, and therefore, based on the principle of the tip discharge in electricity, the low-frequency wave W can be concentrated on the vertex 40 to be released and emitted towards the belly button 11. It is noted that, the vertex 40 is located at the predetermined location P at this time.

Figure 4:
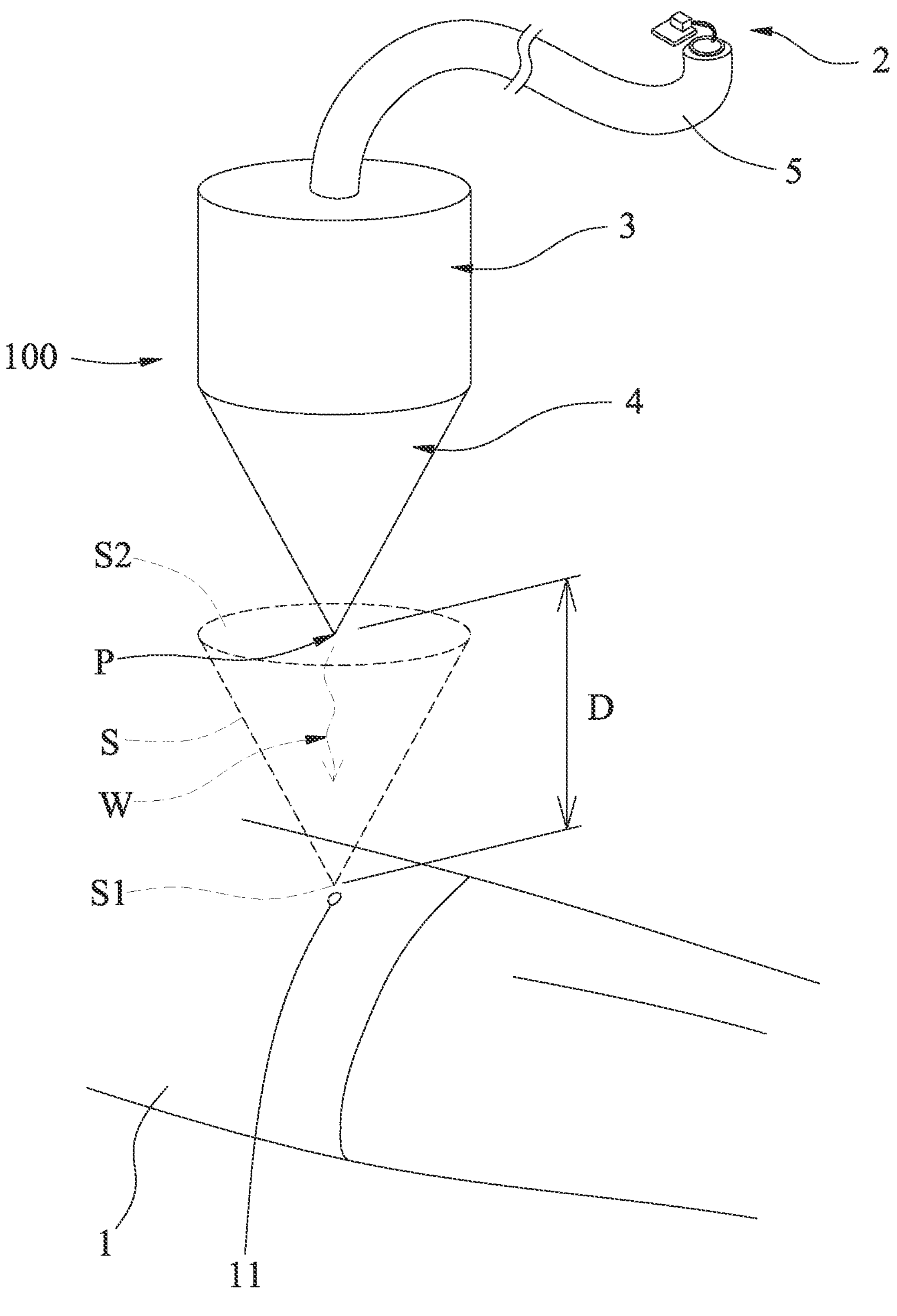
FIG. 4 is a schematic diagram showing a structure of a health care device with a tube according to an embodiment of the present disclosure.

Refer to FIG. 4, and in another one embodiment, the low-frequency wave emitter 2 is connected to the bottom surface 32 of column part 3 via a tube 5. The low-frequency wave W is transmitted to the bottom surface 32 of the column part 3 via the tube 5. The low-frequency wave W then passes to the vertex 40 and is emitted towards the belly button 11 as previously described. With the arrangement of the tube 5, the power supply 21 and/or the vibration part 22 of the low-frequency wave emitter 2 can be kept away from the human body, to avoid interference with any electronic device which has implanted in the human body.

Figure 5:
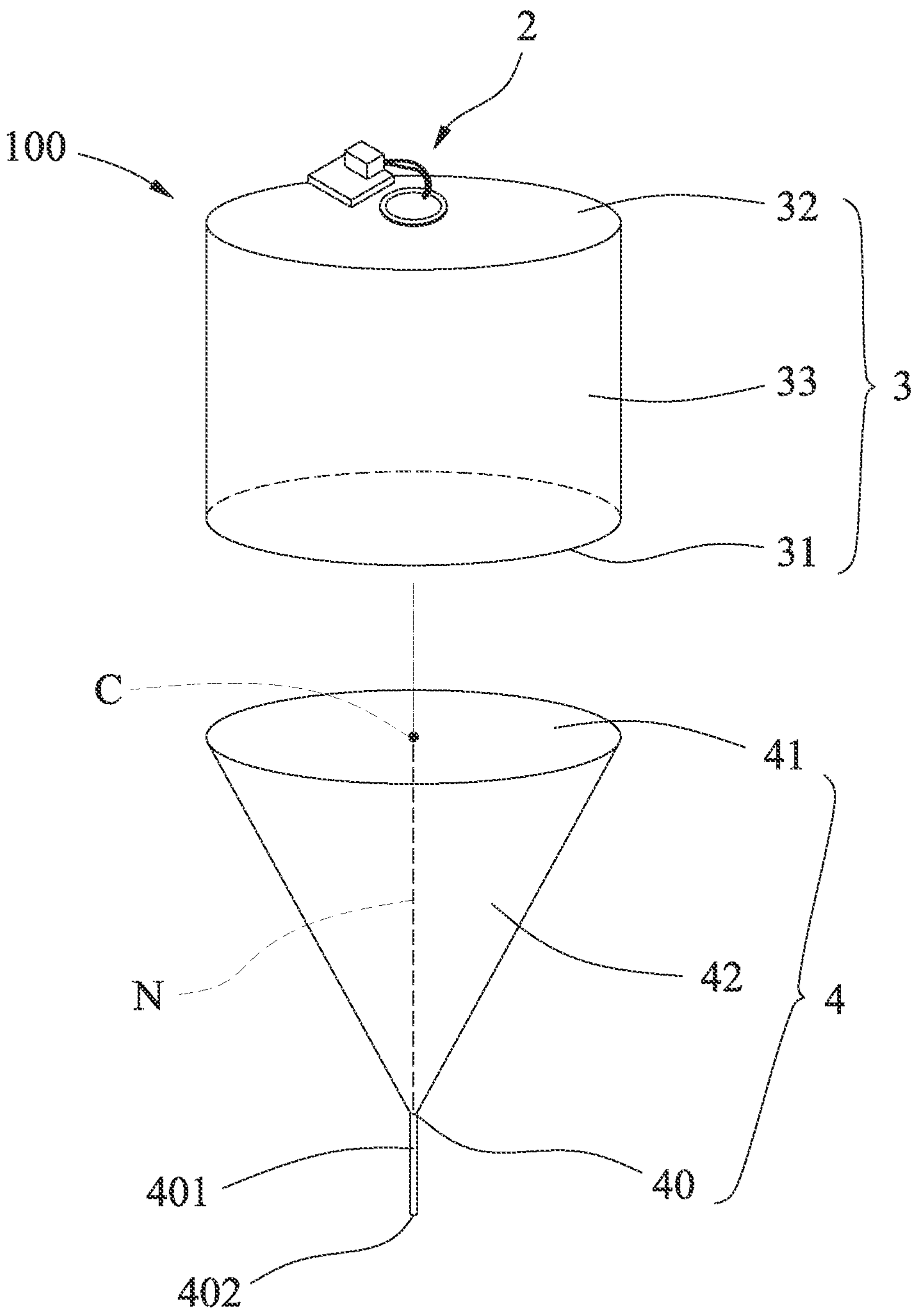
FIG. 5 is a schematic diagram showing a structure of a health care device with a vertically standing rod according to an embodiment of the present disclosure.

Refer to FIG. 5, and in another one embodiment, the vertex 40 further has a rod 401 being vertically standing and having a longitudinal direction away from the bottom surface 41 of the cone 4. Preferably, the rod 401 is a metal rod such as metal silk or metal wire. The longitudinal direction of the rod 401 is coincided with a normal line N of the center C on the bottom surface 41 of the cone/pyramid part 4, and the normal line N of the center C on the bottom surface 41 of the cone/pyramid part 4 passes extends towards the belly button 11. Therefore, the energy of the low-frequency wave W can be more directed to concentrate on a tip 402 of the rod 401 to be released and emitted towards the belly button 11. Specifically, the tip 402 is located at the predetermined location P at this time.

Figure 6:
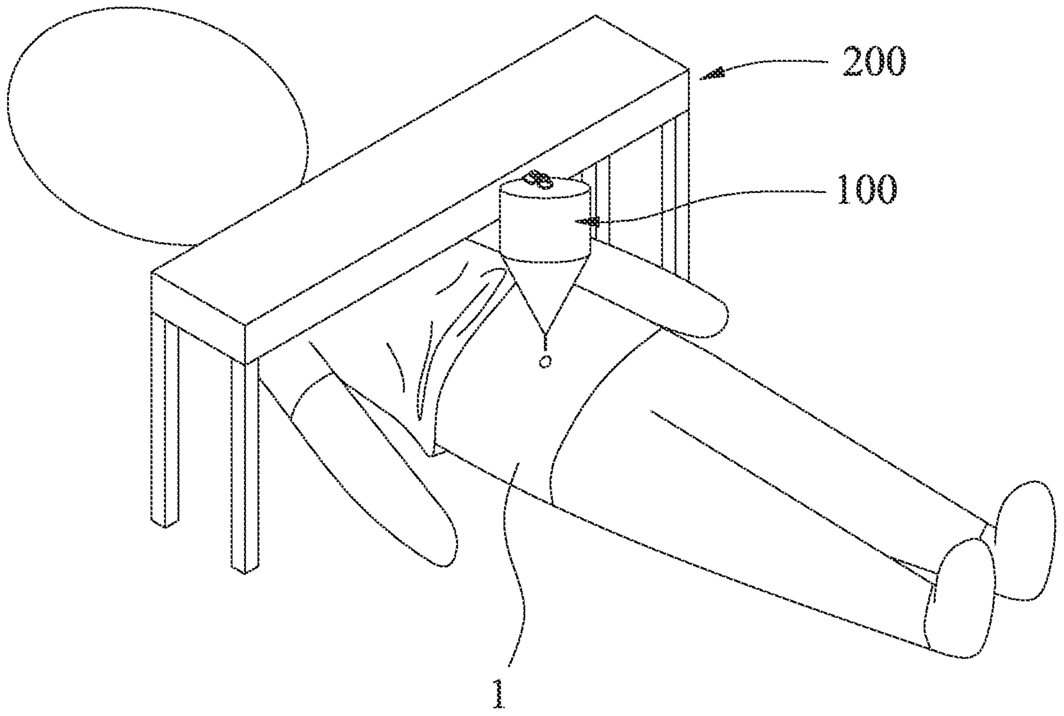
FIG. 6 is a schematic diagram showing a structure of a health care device installed on or in a frame according to an embodiment of the present disclosure.

Refer to FIG. 6, in another one embodiment, the health care device 100 is installed in or on a frame 200, the user 1 is lying on the platform (not shown in the drawings), the frame 200 is erected on the platform, and the health care device 100 is located above the belly button of the user 1. In this way, the user 1 can also get a proper rest during the health care process.

Figure 7:
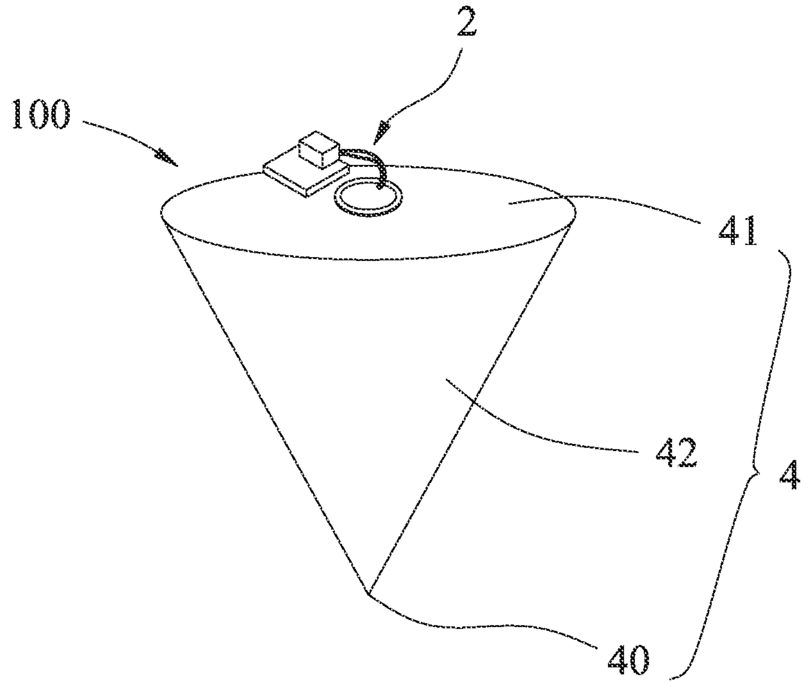
FIG. 7 is a schematic diagram showing a structure that a low-frequency wave emitter of a health care device is installed on a bottom surface of a cone/pyramid part according to an embodiment of the present disclosure.

Refer to FIG. 7, in another one embodiment, the health care device 100 can also comprises the low-frequency wave emitter 2 and the cone/pyramid part 4, but the column part 3 is not included in the health care device 100. The low-frequency wave emitter 2 is arranged on the bottom surface 41 of cone/pyramid part 4, and the low-frequency wave emitter 2 is connected to the bottom surface 41 of the cone/pyramid part 4. Preferably, the low-frequency wave emitter 2 is directly connected to the bottom surface 41 of cone/pyramid part, for example, the low-frequency wave emitter 2 is adhered, welded or screwed to the bottom surface 41 of the cone/pyramid part 4. Thus, after activating the power supply 21, the vibration part 22 vibrates to generate low-frequency wave W of the predetermined frequency (see FIG. 1 again). Next, the low-frequency wave W is transmitted to the bottom surface 41 of the cone/pyramid part 4 and vertex 40 of the cone/pyramid part 4. By using the cone/pyramid design that the diameter is tapered from the bottom surface 41 to the vertex 40 of the cone/pyramid part 4, the energy of the low-frequency wave W is getting concentrated when transmitting to the vertex 40. The cone/pyramid part 4 can be a wooden or metal cone or pyramid, and preferably, the cone/pyramid part 4 is a one-piece wooden cone or pyramid.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A health care method, comprising:

arranging a health care device at a predetermined location in front of a belly button of a user with a predetermined distance; and using the health care device to emit a low-frequency wave with a predetermined frequency to the belly button;

wherein the health care device comprises:

a cone/pyramid part, having a vertex, a bottom surface and a body, wherein two ends of the body of the cone/pyramid part are respectively connected to the vertex and the bottom surface of the cone/pyramid part; and a low-frequency wave emitter, connected to the bottom surface of the cone/pyramid part, configured to emit the low-frequency wave with the predetermined frequency;

wherein the predetermined frequency is between 1.27 Hz and 1.81 Hz;

wherein the low-frequency wave emitter is an infrasonic transducer, and the low-frequency wave is an infrasonic wave;

wherein the predetermined location is located on a virtual bottom surface of a virtual cone above the belly button, the predetermined distance is 5 cm to 8 cm; the predetermined location is a circular center of the virtual bottom surface, the predetermined distance is a distance from the circular center of the virtual bottom surface to the belly button, and the vertex of the health care device is located on the predetermined location.

2. The health care method of claim 1, wherein the predetermined frequency is 1.45 Hz.

3. The health care method of claim 1, wherein the cone/pyramid part is a one-piece wooden cone or pyramid.

* * * * *